United States Patent [19]

Ito et al.

[11] Patent Number: 5,934,920

[45] Date of Patent: *Aug. 10, 1999

[54] CARD-IN TYPE SHIELD CONNECTOR

[75] Inventors: Toshiyasu Ito, Togane; Shigeru Sato, Yotsukaido, both of Japan

[73] Assignee: Yamaichi Electronics Co., Ltd., Tokyo, Japan

[*] Notice: This patent is subject to a terminal disclaimer.

[21] Appl. No.: 08/775,246

[22] Filed: Dec. 30, 1996

[30] Foreign Application Priority Data

Dec. 28, 1995 [JP] Japan ................................. 7-353188

[51] Int. Cl.⁶ .................................................. H01R 13/62
[52] U.S. Cl. ............................................ 439/159; 439/946
[58] Field of Search ..................................... 439/159, 638, 439/160, 946, 946.2, 945; 361/752, 737, 684

[56] References Cited

U.S. PATENT DOCUMENTS

| | | | |
|---|---|---|---|
| 5,257,414 | 10/1993 | Trahan et al. | 439/160 |
| 5,572,408 | 11/1996 | Anhalt et al. | 361/752 |
| 5,583,745 | 12/1996 | Uwabo et al. | 361/684 |
| 5,668,365 | 9/1997 | Ito et al. | 235/486 |
| 5,674,080 | 10/1997 | Takemura | 439/159 |
| 5,679,007 | 10/1997 | Potdevin et al. | 439/76.1 |

*Primary Examiner*—Gary Paumen
*Assistant Examiner*—Tho D. Ta
*Attorney, Agent, or Firm*—Wenderoth, Lind & Ponack, L.L.P.

[57] ABSTRACT

A card-in type shield connector is to be inserted into an electronic device in order to add a memory function to the electronic device. The card-in type shield connector includes a contact element disposed within a flat and thin insulative case into which a memory card can be withdrawably inserted, and a card ejection mechanism disposed within the flat and thin insulative case and adapted to eject the memory card from inside the flat and thin insulative case. An outer surface of the flat and thin insulative case is shielded by a shield plate.

9 Claims, 4 Drawing Sheets

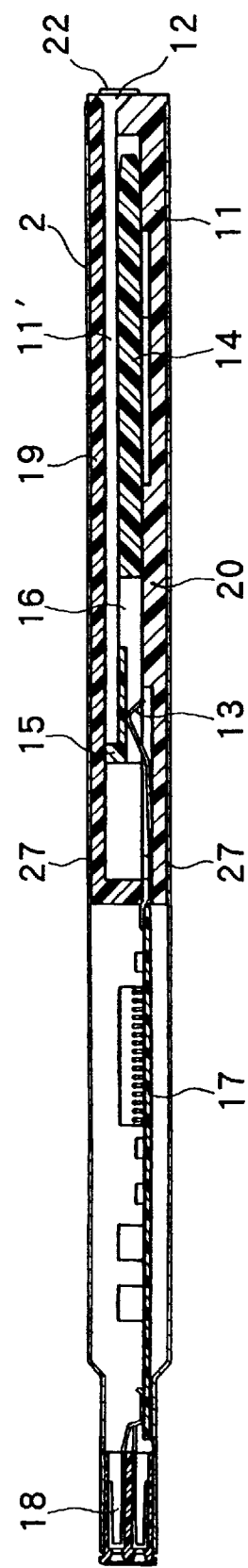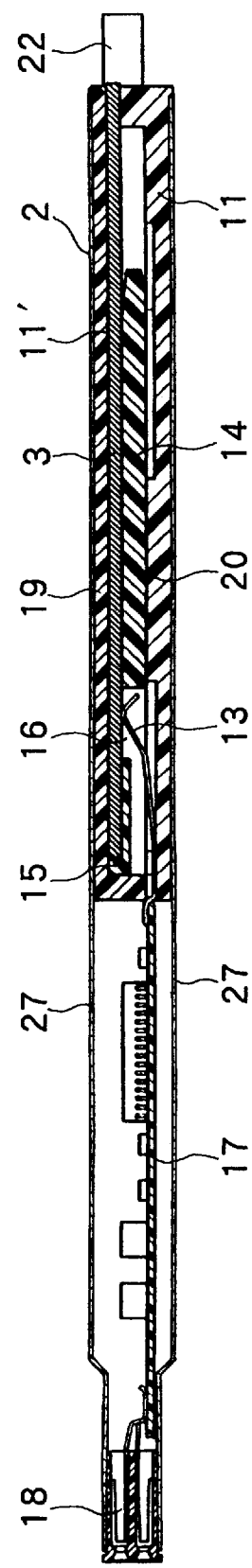

CARD-IN TYPE SHIELD CONNECTOR

BACKGROUND OF THE INVENTION

1. Field of the Invention

This invention relates to a card-in type shield connector designed for use in insertion of a memory card into a given electronic device such as a computer, a word processor or the like in order to provide data thereto.

2. Brief Description of the Prior Art

The memory card is inserted into an inlet port of a given electronic device such as a personal computer, a word processor or the like and used for the purpose of adding a required memory function thereto. For this purpose, the memory card has specifications made in accordance with the standards. Since this type of memory card has a single function, a single card can provide only a limited function. For this reason, users are often required to prepare several memory cards.

In order to obviate this inconvenience on the part of the users, it can be contemplated to prepare a card-in type connector which is formed in accordance with the standards as a parent card and replaceable memory cards (child card) having a memory element are selectively inserted into the connector so that the parent card may be inserted into the given electronic device.

Incidentally, the electronic elements incorporated in the memory card and the card-in type shield connector into which the memory card is to be inserted are readily broken by mechanical impacts, high-frequency noises and static current. Therefore, an effective counter-measure is demanded.

The present invention has been accomplished in view of the above situation.

SUMMARY OF THE INVENTION

It is, therefore, an object of the present invention to provide a card-in type shield connector capable of effectively protecting a memory card from mechanical impacts, static current and high-frequency noises.

In order to achieve the above object, there is essentially provided a card-in type shield connector which is to be inserted into an electronic device in order to add a memory function to the electronic device. The card-in type shield connector comprises a contact element disposed within a flat and thin insulative case into which a memory card is withdrawably inserted, and card ejection means disposed within the flat and thin insulative case and adapted to eject the memory card from inside the flat and thin insulative case. An outer surface of the flat and thin insulative case is shielded by a shield plate.

A connecting device to be connected to a connecting part of an electronic device may be retained on an inner surface of a front end portion of the shield plate.

It is preferred that a wiring plate connected to the contact extends from a front end of the flat and thin insulative case, and that the wiring plate, is shielded by the shield plate.

It is also preferred that a wiring board connected to the contact is disposed forwardly of the flat and thin insulative case, that a connecting device, which is connected to the wiring board so as to be connected to a connecting part of the electronic device, is disposed on a front end of the wiring board, and that the wiring board and the connecting device connected to the wiring board are shielded by the shield plate.

The shield plate may include at left and right lug portions thereof an insert guide portion formed of a stepped portion extending from a front end to a rear end thereof.

The above and other objects and attendant advantages of the present invention will be apparent to those skilled in the art from a reading of the following description and claims in conjunction with the accompanying drawings which constitute part of this specification.

BRIEF DESCRIPTION OF THE DRAWINGS

FIG. 5(A) is a sectional view of the card-in type shield connector before the memory card is inserted therein, and FIG. 5(B) is a sectional view of the card-in type shield connector after the memory card is inserted therein.

DETAILED DESCRIPTION OF THE PREFERRED EMBODIMENT

One preferred embodiment of the present invention will now be described in great detail with reference to the accompanying drawings.

Figure 1A:
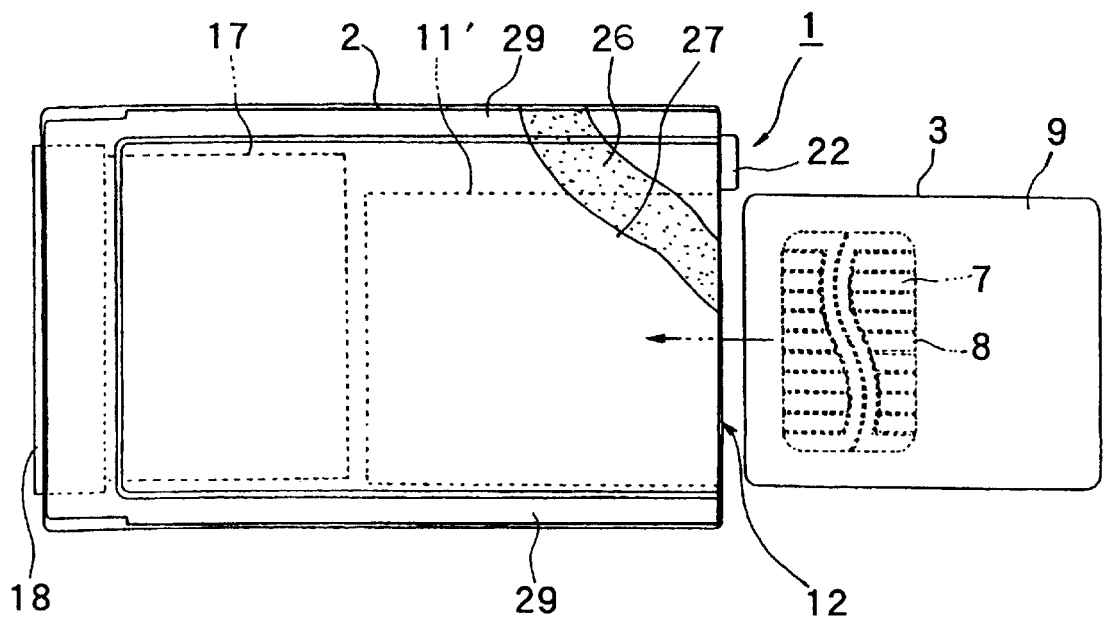
FIG. 1(A) is a plan view, partly cut-away, showing a card-in type shield connector according to one preferred embodiment of the present invention, and FIG. 1 (B) is a front view thereof.
Figure 1B:
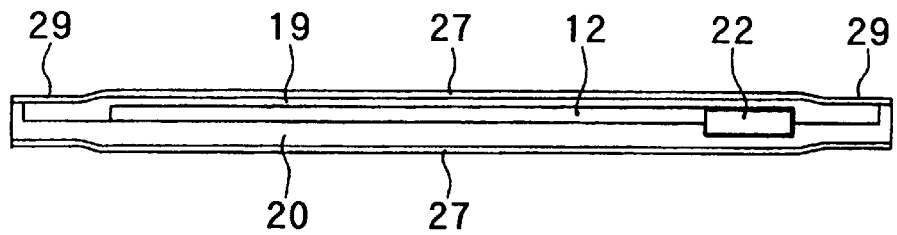
Figure 2:
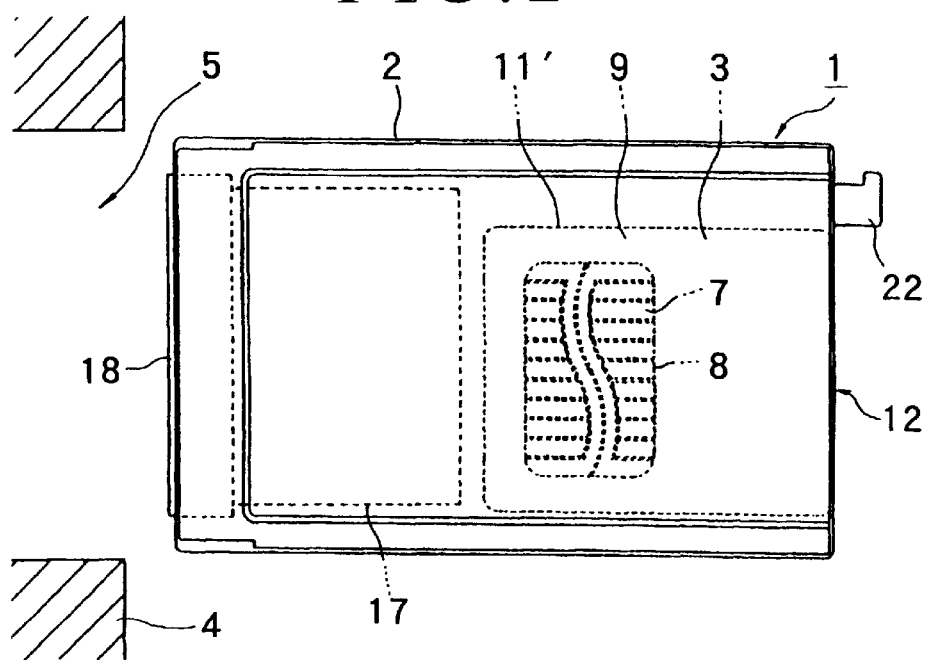
FIG. 2 is a plan view of the card-in type shield connector with a memory card already inserted therein.
Figure 3:
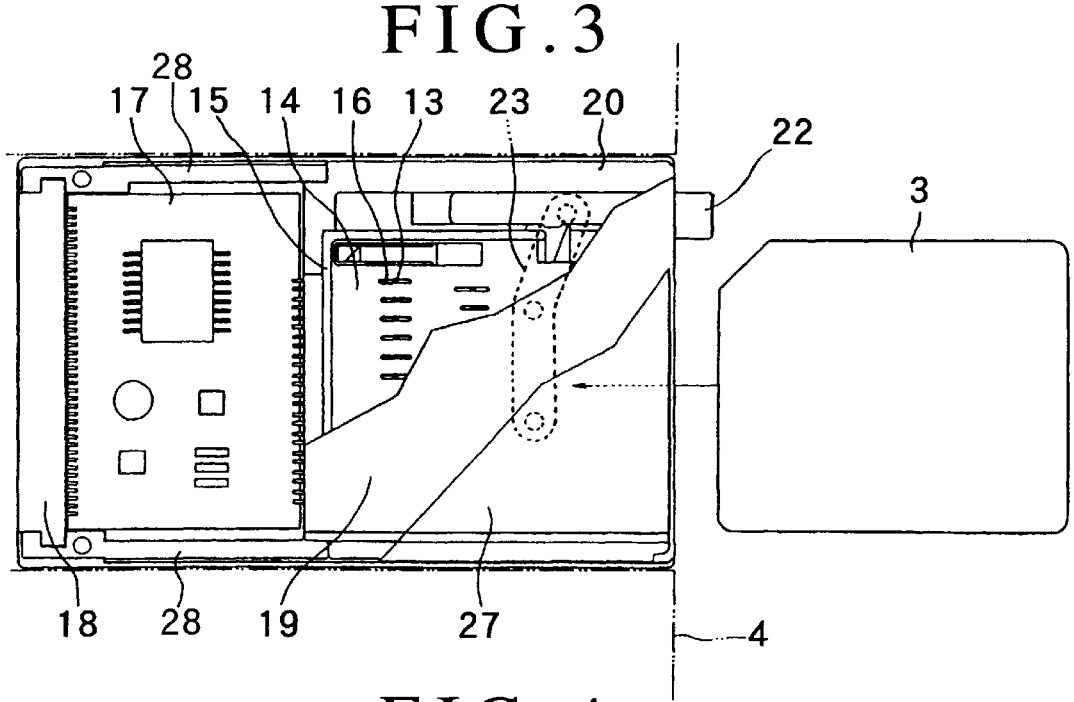
FIG. 3 is a plan view showing an internal construction of the card-in type shield connector before the memory card is inserted therein.
Figure 4:
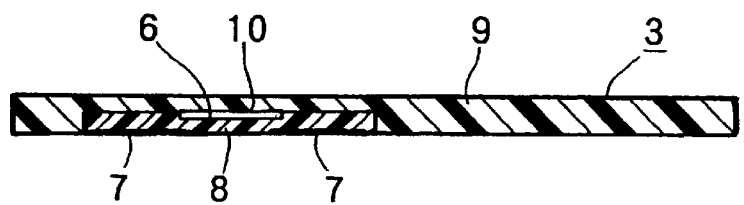
FIG. 4 is a sectional view of the memory card.

As shown in FIGS. 1 through 3, this invention relates to a card-in type shield connector 1 designed to be inserted into an inlet port 5 of a given electronic device 4 such as a personal computer, a word processor or the like for the purpose of adding or changing a predetermined memory function with respect to the electronic device. This card-in type shield connector 1 comprises a shield connector body 2 which can be withdrawably inserted into the inlet port 5 of the electronic device 4, and a replaceable memory card 3 which can be withdrawably inserted into the shield connector body 2.

As shown in FIGS. 1 (A) and 4, the memory card 3 comprises an IC retaining plate 8, and a base plate 9 to which the IC retaining plate 8 is intimately attached. The IC retaining plate 8 has an IC chip 6 as a memory element, and leads 7 as external terminals thereof, intimately attached to an outer surface of the IC retaining plate 8.

The base plate 9 is a rectangular carrier for inserting the memory card 3 into an insert port 12 of the shield connector body 2. The IC chip 6 is selectively bonded to the base plate 9 by the retaining plate 8.

The base plate 9 has a recess 10 formed in a top surface thereof. The IC retaining plate 8 is bonded to an inner bottom surface of the recess 10 so that the IC retaining plate 8 will not project from the top surface of the base plate 8.

As shown in FIGS. 3, 5(A) and 5(B), as well as elsewhere, the shield connector body 2 has a card receiving portion 11' for receiving the memory card 3 through the card insert port 12 formed in one end thereof.

The memory card 3 is inserted into the receiving portion 11' within the shield connector body 2 through the card insert port 12 so as to be contacted with contacts 13 arranged in the receiving portion 11'. When inserted into the electronic device, the memory card 3 can provide the card-specific recording data recorded in the IC chip 6 to the electronic device through the contacts 13 which are in contact with the leads 7 of the memory card 3.

The card receiving portion 11' of the shield connector body 2 is formed by a flat and thin insulative case 11 having a rectangular outer configuration, and the card insert port 12 is open to a front end portion of the flat and thin insulative case 11.

The flat and thin insulative case 11 contains therein a card tray 14 which slides following the action of card insertion within the IC receiving portion 11'. The flat and thin insulative case 11 is also provided therein with the contacts 13 for connection of a data processing circuit the contacts 13 being resiliently shifted between a contacting position and a contact-releasing position by the sliding movement of the card tray 14.

One end of each contact 13 is soldered to a top surface of a wiring board 17 disposed forwardly of the flat and thin insulative case 11 and connected to the data processing circuit consisting of a control element loaded on the wiring board 17. A connecting device 18 which can be withdrawably inserted into a connecting part of the electronic device 4 is disposed at a front end of the wiring board 17. The connecting device 18 is in connection with the wiring board 17. Accordingly, the memory card 3 is connected to the electronic device 4 through the contacts 13, the wiring board 17 and the connecting device 18.

As shown in FIGS. 5(A) and 5(B), when the memory card 3 is inserted into the card receiving portion 11' through the card insert port 12, the card 3 shifted on an upper surface of a bottom plate of the card tray 14 with a front end of the card 3 abutted with a front abutment 15 formed on a front end of the tray 14 such that the tray 14 slides forwardly together with the card 3.

That is, in accordance with the card insertion, the card tray 14 slides from a rear slide position shown in FIG. 5(A) to a front slide position as shown in FIG. 5(B). When the card tray 14 is located in the rear slide position of FIG. 5(A), the contact 13 are abutted with a lower surface of the bottom plate of the card tray 14 and shifted downwardly (i.e., the contacts 13 are in a contact releasing state). When the card tray 14 slides to the front slide position of FIG. 5(B), the contacts 13 slide on the lower surface of the bottom plate of the card tray 14 and is shifted upwardly to an upper surface of the bottom plate through contact ports 16 formed in the bottom plate. By this shifting, the contacts 13 are brought into contact under pressure with corresponding leads 7 of the memory card 3.

The shield connector body 2 further contains a means for ejecting the memory card 3. This card ejection means is adapted to move the card tray 14 (this card tray 14 also serves as a contact opening- and closing-slide plate) in a direction opposite to the card insertion direction with the front end of the card 3 abutted with the front abutment 15 until the card 3 is ejected outwardly from the card insert port 12. The card 3 thus ejected can easily be removed.

Figure 6:
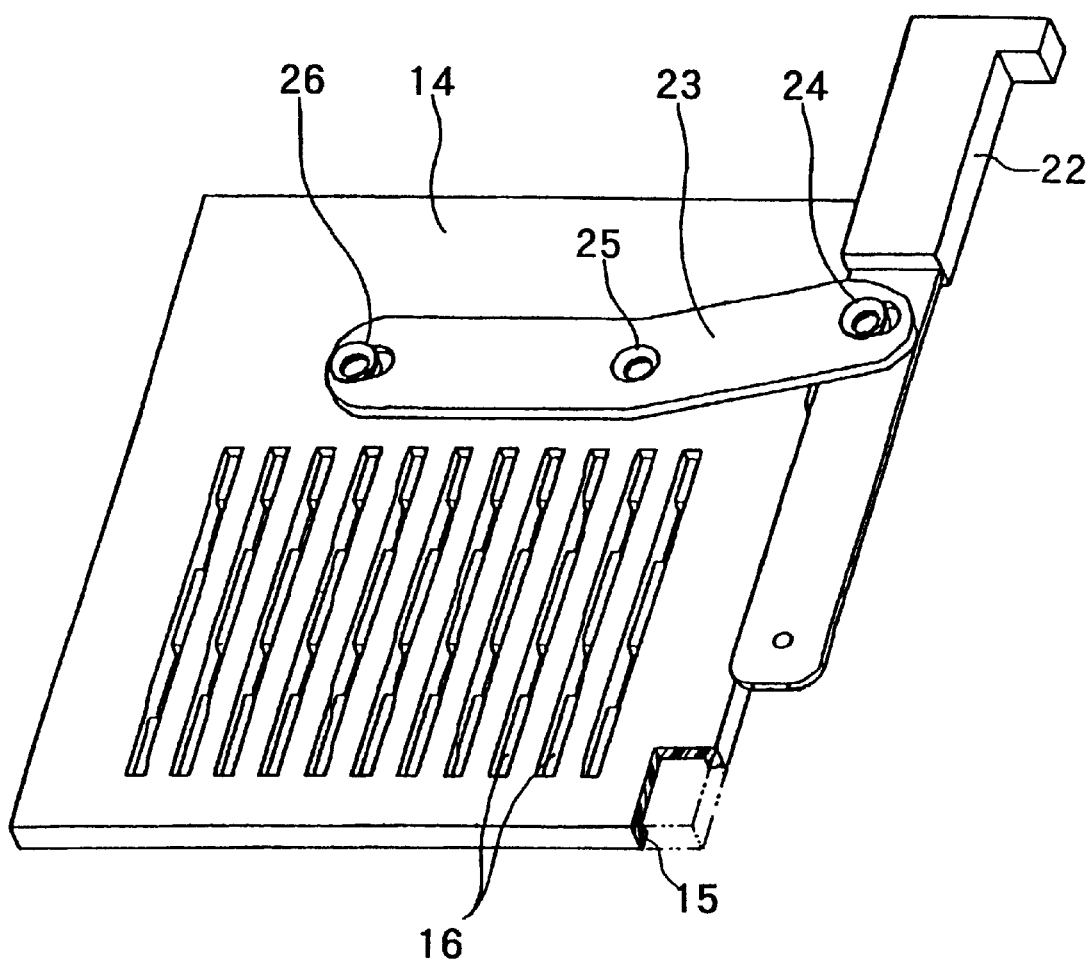
FIG. 6 is a perspective view of a card ejection means in the card-in type shield connector when viewed from the back of the card-in type shield connector.

For example, FIGS. 3 and 6 show concrete examples of the ejection means. In the flat and thin insulative case 11, the card receiving portion 11' is formed between an upper surface plate 19 and a lower surface plate 20 which are formed of insulative plates. The card tray 14 is contained within the card receiving portion 11'. The card tray 14 slides forwardly and backwardly with the upper and lower surface plates 19 and 20 serving as a guide.

That is, for guiding the sliding movement of the tray 14, the bottom plate for loading thereon the card 3 of the card tray 14 is superimposed upon an inner surface of the lower surface plate 20, and the front abutment 15 for restricting the front end edge of the card is abutted with the inner surface of the upper surface plate 19.

On the other hand, an ejection lever 22 is disposed adjacent to one side of the card tray 14, and the ejection lever 22 and the card tray 14 are linked together by a link 23 so that the ejection lever 22 can be slid in the card insertion direction. As a consequence, when the ejection lever 22 is pushed, the card tray 14 is moved through the link 23.

For example, one end of the link 23 is pivotally joined to the ejection lever 22 and the other end is pivotally joined to the card tray 14. An intermediate portion of the link 23 is pivotally supported by the lower surface plate 20 of the insulative case 11, and a rear end of the ejection lever 22 projects from a front end of the case 11 at a location adjacent to the card insert port 12, thereby forming a control portion.

A pushing force applied to the ejection lever 22 is transmitted to the link 23 through a pivot joining point 24, the link 23 is turned about a pivot point 25, and this turning force is applied to a pivot joining point 26 to move the card tray 14. The movement of the card tray 14 in a direction opposite to the card insertion direction causes the front abutment 15 to push the card 3 so that a rear end of the card 3 projects outwardly from the card insert port 12.

On the contrary, when the card 3 is inserted, the card tray 14 is moved in the card insertion direction and this moving force is applied to the ejection lever 22 through the link 23, so that the lever 22 is pushed into a standby position where the lever 22 is located before it is pushed and awaits the next ejecting operation. In this way, it becomes possible to replace the memory card 3.

As described above, the shield connector body 2 includes the card tray 14 and contacts 13 disposed within the flat and thin insulative case 11. It further includes at the front end of the case 11 the wiring board 17, for loading thereon the control element, connected to the contacts 13, and the connecting device 18 connected to the front end of the wiring board 17. By withdrawably inserting the shield connector body 2 into the electronic device through the connecting device 18, the shield connector body 2 can be connected to the data processing circuit in the electronic device. The outer surface of the insulative case 11 is shielded by two shield plates 27 which are formed of conductive plates.

As shown in FIGS. 3, 5(A) and 5(B), as well as elsewhere, the shield plates 27 cover the top and bottom surfaces of the insulative case 11, wiring board 17 and connecting device 18. The connecting device 18 includes contacts within the insulative body, so that the connecting device 18 will be connected to contacts of the connecting part of the electronic device through the first-mentioned contacts. An insulative body of the connecting device 18 is disposed between front end portions of the shield plate 27. Accordingly, the inner surfaces of the front end portions of the shield plates 27 are superimposed upon and contacted with the surface of the insulative body.

The shield plates 27 cover the outer surfaces of the upper surface plate 19 and lower surface plate 20 of the flat and thin insulative case 11 and are bonded to the outer surfaces of the upper and lower surface plates 19 and 20 through an adhesive 26.

Stainless plates are used as the shield plates 27. However, other metal plates may be used as the shield plates 27. Also, conductive plates obtained by intimately adhering conductive layers to synthetic resin plates or the like by deposition may be used as the shield plates 27.

Also, conductive layers may be intimately adhered to the outer surfaces of the upper surface plate 19 and the lower surface plate 20 so as to be used as the shield plates 27.

As described in the foregoing, the card-in type shield connector 1 serves to add a memory function to the electronic device 4 when inserted into the electronic device 4. The connector 1 includes the contact elements 13 to be contacted with the memory card 3, and the card ejection means for ejecting the memory card 3 out of the flat and thin insulative case 11 as well as the flat and thin insulative case 11 into which the memory card 3 is withdrawably inserted. The outer surfaces of the flat and thin insulative case 11 is shielded by the shield plates 27.

The connecting device 18 to be connected to the connecting device of the electronic device 4 is retained on the inner surface of the front end portions of the shield plates 27.

The wiring board 17 connected to the contact 13 extends from the front end of the flat and thin insulative case 11, and the wiring board 17 is shielded by the shield plates 27. A pair of arms 28, 28 extend forwardly in parallel relation from opposite ends of the front surface of the flat and thin insulative case 11. The wiring board 17 is disposed in a space between the arms 28 and 28. Opposite ends of the connecting device 18 are engaged with and retained between free ends of the arms 28 and 28.

Also, as shown in FIG. 1, as well as elsewhere, the shield plates 27 are provided at left and right lug portions thereof with an insertion guide portion 29 formed of a stepped-portion extending from the front end to the rear end thereof.

Accordingly, the upper surface plate 19 and the lower surface plate 20 of the flat and thin insulative case 11 are also provided at left and right lug portions thereof with insertion guide portions formed of stepped-portions extending from the front end to the rear end thereof. Both of the insertion guide portions are overlapped with each other, and a guide surface for guiding the flat and insulative case 11 into the inlet port 5 of the electronic device 4 is formed by the outer surface of the insertion guide portion 29.

By inserting the shield connector body with the memory card inserted therein into the electronic device, data recorded in the memory card can be provided to the electronic device. Also, the data stored in the electronic device can be stored in the memory card, and the memory card can be replaced as necessary.

Users can own as many memory cards as desired and a single shield connector body. By selectively inserting one of the memory cards into the shield connector and then inserting the shield connector into the electronic device, the users can add a variety of functions to the electronic device.

Also, the memory card and the electronic part connecting device loaded on the wiring board can be protected from static current and high-frequency noises by the shield plates. As a consequence, those static current and high-frequency noises can appropriately and effectively be prevented from flowing into the electronic device side through the wiring board and contacts, thus enabling the card-in type shield connector to fully exhibit its functions.

Furthermore, the shield plates can effectively protect the electronic elements within the connector from mechanical impacts and maintain them in good condition.

Although this invention has been described in its preferred form with a certain degree of particularity, it should be understood that the present disclosure of the preferred form has been made only by way of example and that numerous changes in the details of construction and arrangement of parts may be resorted to without departing from the spirit and the scope of the invention as hereinafter claimed.

What is claimed is:

1. A card-in type shield connector adapted to receive a memory card having at least one lead and adapted to be inserted into an electronic device, said card-in type shield connector comprising:

a thin and flat type insulative case into which the memory card can be removably inserted, said insulative case having a front end and a rear end;

a shield plate shielding an outer surface of said insulative case;

at least one elongated memory card contact disposed in said insulative case said at least one elongated memory card contact including a cantilever contacting portion resiliently biased in a direction so as to be adapted to contact the at least one lead of the memory card;

a memory card tray movably mounted in said insulative case for movement between a rearward, memory card-insertion position and a forward, memory card-use position in which said elongated memory card contact resiliently contacts the lead of the memory card when the memory card is provided on said memory card tray; and a memory card ejection mechanism disposed within said insulative case and including an ejection member for ejecting the memory card from inside said insulative case.

2. A card-in type shield connector as recited in claim 1, wherein aid memory card tray has a contact port formed therethrough, and an end portion of said elongated memory card contact protrudes through said contact port and contacts the lead of the memory card when said memory card tray is in said forward, memory card-use position and the memory card is provided on said memory card tray.

3. A card-in type shield connector as recited in claim 1, further comprising a connecting device, for connection to a connecting part of the electronic device, is retained on an inner surface of a front end portion of said shield plate.

4. A card-in type shield connector as recited in claim 1, further comprising a wiring board connected to said elongated memory card contact, extending from a front end of said insulative case and shielded by said shield plate.

5. A card-in type shield connector as recited in claim 1, further comprising a wiring board connected to said elongated memory card contact, disposed forwardly of said insulative case and shielded by said shield plate; and a connecting device to be connected to a connecting part of the electronic device, said connecting device being connected to said wiring board, disposed at a front end of said wiring board and shielded by said shield plate.

6. A card-in type shield connector as recited in claim 1, wherein said shield plate includes, at left and right side portions thereof, insertion guides respectively formed of elongated stepped portions extending from a front end toward a rear end of said shield plate.

7. A card-in type shield connector as recited in claim 1, further comprising the memory card having the at least one lead; and wherein said at least one lead of said memory card is intimately attached at one of upper and lower surfaces of said memory card.

8. A card-in type shield connector as recited in claim 1, wherein said ejection member comprises an ejection lever operably coupled to said memory card tray.

9. A card-in type shield connector as recited in claim 8, wherein said ejection mechanism further comprises a link pivotally connected between said ejection lever and said memory card tray and pivotally supported by said insulative case.

* * * * *